US012270576B1

(12) United States Patent
Carson

(10) Patent No.: US 12,270,576 B1
(45) Date of Patent: Apr. 8, 2025

(54) WATER HEATER CLEAN OUT DEVICE AND METHOD OF CLEANING OUT A WATER HEATER

(71) Applicant: Geoffrey H Carson, Lake Ozark, MO (US)

(72) Inventor: Geoffrey H Carson, Lake Ozark, MO (US)

( * ) Notice: Subject to any disclaimer, the term of this patent is extended or adjusted under 35 U.S.C. 154(b) by 0 days.

(21) Appl. No.: 18/756,192

(22) Filed: Jun. 27, 2024

(51) Int. Cl.

| | |
|---|---|
| ***F24H 9/00*** | (2022.01) |
| ***A47L 7/00*** | (2006.01) |
| ***A47L 9/24*** | (2006.01) |
| ***B08B 5/04*** | (2006.01) |
| ***B08B 9/08*** | (2006.01) |

(52) U.S. Cl.
CPC ............ *F24H 9/0042* (2013.01); *A47L 7/009* (2013.01); *A47L 9/242* (2013.01); *B08B 5/04* (2013.01); *B08B 9/083* (2013.01); *B08B 2209/08* (2013.01)

(58) Field of Classification Search
None
See application file for complete search history.

(56) References Cited

U.S. PATENT DOCUMENTS

| | | | | |
|---|---|---|---|---|
| D805,267 S | | 12/2017 | Maune | |
| 11,920,830 B1 | | 3/2024 | Mcnally | |
| 2010/0186188 A1* | | 7/2010 | Williams | A47L 5/24 15/344 |
| 2012/0298143 A1* | | 11/2012 | Mai | F28G 1/00 134/21 |
| 2022/0322899 A1* | | 10/2022 | Reeder | A47L 9/0693 |

OTHER PUBLICATIONS

SR123 Deluxe Water Heater Rinse Tool, Water Connection Inc., Retrieved Mar. 11, 2024 https://www.waterconnection.com/product/sr123-deluxe-water-heater-rinse-tool/.
Turbo Tank Cleaner, Retrieved Mar. 11, 2024 https://turbotankcleaner.com.
Water Heater Clean Out Tool, For Sale By Inventor, published Apr. 29, 2016, Retrieved Mar. 11, 2024 https://forsalebyinventor.com/products/water-heater-clean-out-tool/.

* cited by examiner

*Primary Examiner* — Natasha N Campbell
*Assistant Examiner* — Pradhuman Parihar
(74) *Attorney, Agent, or Firm* — Carson Patents; Gregory D Carson

(57) ABSTRACT

The water heater clean out device of the present invention is attached to a vacuum cleaner to vacuum up the built-up solids deposit from a bottom of a water heater. The articulating joint of the present invention allows the user to be able to easily reach all areas of the bottom of the water heater. The water heater clean out device uses a pull cord and pulley/cord reel system to maneuver the end of the tool inside the water heater.

12 Claims, 2 Drawing Sheets

WATER HEATER CLEAN OUT DEVICE AND METHOD OF CLEANING OUT A WATER HEATER

BACKGROUND OF THE INVENTION

Technical Field

This invention relates generally to a water heater clean out device. This invention relates more particularly to an apparatus/device for removing water deposited solids from the bottom of a water heater.

This invention relates generally to apparatuses and devices for cleaning out the bottom of a water heater. This invention relates more particularly to a device for cleaning out the bottom of a water heater using a vacuum cleaner attachment.

Background Art

Currently, tools and devices for cleaning out a water heater exist in the prior art. These tools and devices use water to rinse out the water heater to remove the buildup. All of the tools in the prior art are not capable of articulating the inserted device in order to fully remove the buildup in the water heater. Further, these devices only spray water to break up the water deposits, they do not actually remove the deposits.

The prior art describes a method for cleaning scale buildup in a water heater using a cleaning agent that includes sodium hydroxide, sodium metasilicate, and sodium gluconate. The method involves diluting the cleaning agent with water and circulating it through the water heater system to dissolve and remove scale deposits. Additionally, the prior art discusses the use of a pH indicator to monitor the cleaning process and determine when the scale has been effectively removed.

The prior art also describes a method and device for cleaning the heat exchange pipe of a water heater. It proposes a process involving filling the heat exchange pipe with a cleaning solution containing sodium hydroxide, sodium tripolyphosphate, and sodium gluconate, then circulating the solution through the pipe to dissolve and remove scale deposits. The method aims to effectively clean the heat exchange pipe while minimizing damage to the pipe material.

Further, the prior art describes an automatic cleaning device designed for water heaters. It features a structure comprising a cleaning box, a water inlet pipe, a water outlet pipe, and a cleaning pump. The device works by circulating a cleaning solution through the water heater to dissolve and remove scale buildup, thus improving its efficiency and prolonging its lifespan.

Also present in the prior art is a method to reduce the accumulation of scale in a water heater. The prior art proposes using a magnetic field generator positioned in proximity to the water inlet pipe of the water heater. This magnetic field is purported to alter the characteristics of the water, thereby reducing scale formation. This aims to mitigate the negative effects of scale buildup, such as reduced efficiency and potential damage to the water heater components.

In light of the foregoing prior art, there is a need for an attachment for a vacuum cleaner that has an articulating joint to easily reach and remove water deposited solids from the bottom of a water heater.

The water heater clean out device of the present invention is attached to a vacuum cleaner to vacuum up the buildup in a water heater. The articulating joint of the present invention allows the user to be able to easily reach all areas of the bottom of the water heater, unlike the current tools and devices available.

BRIEF SUMMARY OF THE INVENTION

The water heater clean out device of the present invention is an attachment for a vacuum cleaner that has an articulating joint to easily reach and remove water deposited solids from the bottom of a water heater. The articulating joint is maneuvered using the pull cord means attached to the end of the device.

According to a first aspect of the invention, there is a water heater clean out device configured for attaching to a vacuum cleaner comprising a rigid vacuum hose having a tool end and a vacuum cleaner attachment end for operational attachment to said vacuum cleaner, a first articulating joint operationally attached to said rigid vacuum hose at said tool end, and a vacuum pipe end operationally attached to said first articulating joint.

According to a second aspect of the invention, there is a water heater clean out device wherein said first articulating joint is configured to rotate said vacuum pipe end around an inside of a water heater when inserted in a water heater.

According to a third aspect of the invention, there is a water heater clean out device further comprising a second articulating joint operationally attached between said first articulating joint and said rigid vacuum hose.

According to a fourth aspect of the invention, there is a water heater clean out device further comprising a plurality of articulating joints including said first articulating joint, said second articulating joint, and a third articulating joint.

According to a fifth aspect of the invention, there is a water heater clean out device wherein said first articulating joint comprises stacked conical sections.

According to a sixth aspect of the invention, there is a water heater clean out device wherein said first articulating joint comprises at least one ball and socket joint section.

According to a seventh aspect of the invention, there is a water heater clean out device comprising a pull cord means such as a pull cord having a pull end and an attachment end wherein said attachment end is connectively attached to said vacuum pipe end enabling a movement of said vacuum pipe end.

According to an eighth aspect of the invention, there is a water heater clean out device wherein said pull cord means further comprises a pulley, a cord reel, a motor, and a user operable control configured to extend and retract said pull cord to bend and/or straighten said vacuum pipe end in relation to said rigid vacuum hose.

According to a ninth aspect of the invention, there is a water heater clean out device comprising a vacuum cleaner, a rigid vacuum hose having a vacuum attachment end operationally connected to said vacuum cleaner and a tool end, a first articulating joint operationally attached to said rigid vacuum hose at said tool end, and a vacuum pipe end operationally attached to said first articulating joint.

According to a tenth aspect of the invention, there is a water heater clean out device wherein wherein said first articulating joint is configured to rotate said vacuum pipe end around an inside of a water heater when inserted in a water heater clean out.

According to an eleventh aspect of the invention, there is a water heater clean out device further comprising a second articulating joint operationally attached between said first articulating joint and said rigid vacuum hose.

According to a twelfth aspect of the invention, there is a water heater clean out device further comprising a plurality of articulating joints including said first articulating joint, said second articulating joint, and a third articulating joint.

According to a thirteenth aspect of the invention, there is a water heater clean out device wherein said first articulating joint comprises stacked conical sections.

According to a fourteenth aspect of the invention, there is a water heater clean out device wherein said first articulating joint comprises at least one ball and socket joint section.

According to a fifteenth aspect of the invention, there is a water heater clean out device comprising a pull cord means such as a pull cord having a pull end and an attachment end connectively attached to said vacuum pipe end enabling a movement of said vacuum pipe end.

According to a sixteenth aspect of the invention, there is a water heater clean out device wherein said pull cord means further comprises a pulley, a cord reel, a motor, and a control configured to extend and retract said pull cord to bend and/or straighten said vacuum pipe end in relation to said rigid vacuum hose.

According to a seventeenth aspect of the invention, there is a method of cleaning out a built-up solids deposit from a bottom of a water heater using a water heater clean out device comprising: A) disconnecting a power supply for said water heater; B) turning off a water supply to said water heater; C) draining said water heater; D) connecting said water heater clean out device to a vacuum if said water heater clean out device is not already connected to said vacuum; E) inserting a vacuum pipe end of said water clean out device through an opening of said water heater; F) turning on said vacuum; and G) moving said vacuum pipe end about said bottom of said water heater.

According to an eighteenth aspect of the invention, there is a method of cleaning out a built-up solids deposit from a bottom of a water heater using a water heater clean out device wherein said water heater heats water with at least one electric element further comprising: C)(1) removing a lower heating element from said water heater creating said opening through a side of said water heater after step C.

According to a nineteenth aspect of the invention, there is a method of cleaning out a built-up solids deposit from a bottom of a water heater using a water heater clean out device wherein said water heater heats water with a gas fired element further comprising: C)(1) removal of a drain valve instead of removing a lower heating element from said water heater creating said opening through a side of said water heater after step C.

The advantages of the water heater clean out device of the present invention include: prevention of the need for continual hot water flow and sediment that can lead to clogs and decreased water flow, reduction in odors caused by deposits within the tank, and improved temperature accuracy for more consistent temperature regulation out of the faucet.

The invention will now be described, by way of example only, with reference to the accompanying drawings in which:

DETAILED DESCRIPTION OF THE INVENTION

Figure 1:
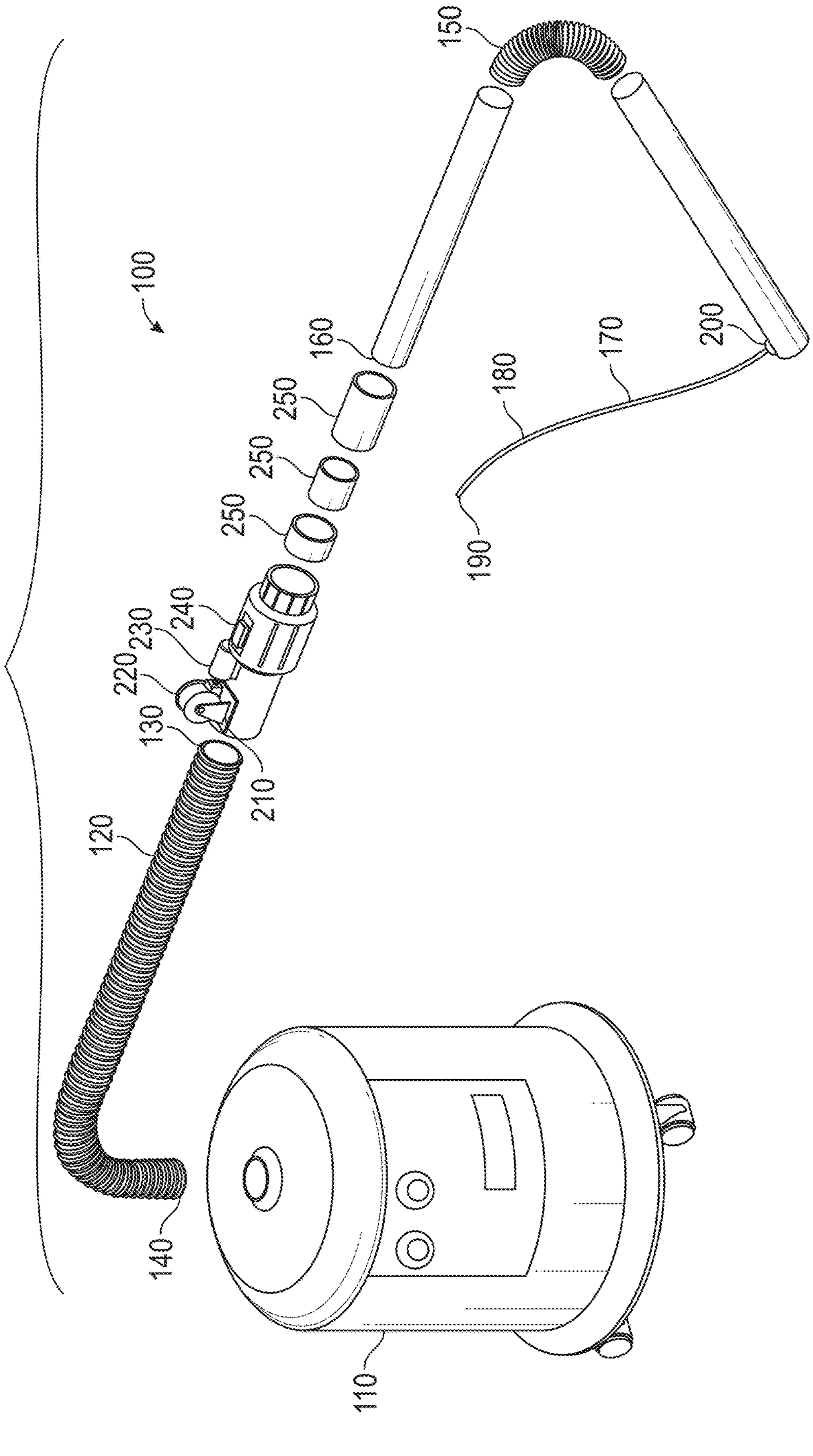
FIG. 1 is a perspective exploded view of the water heater clean out device according to the invention.
Figure 2:
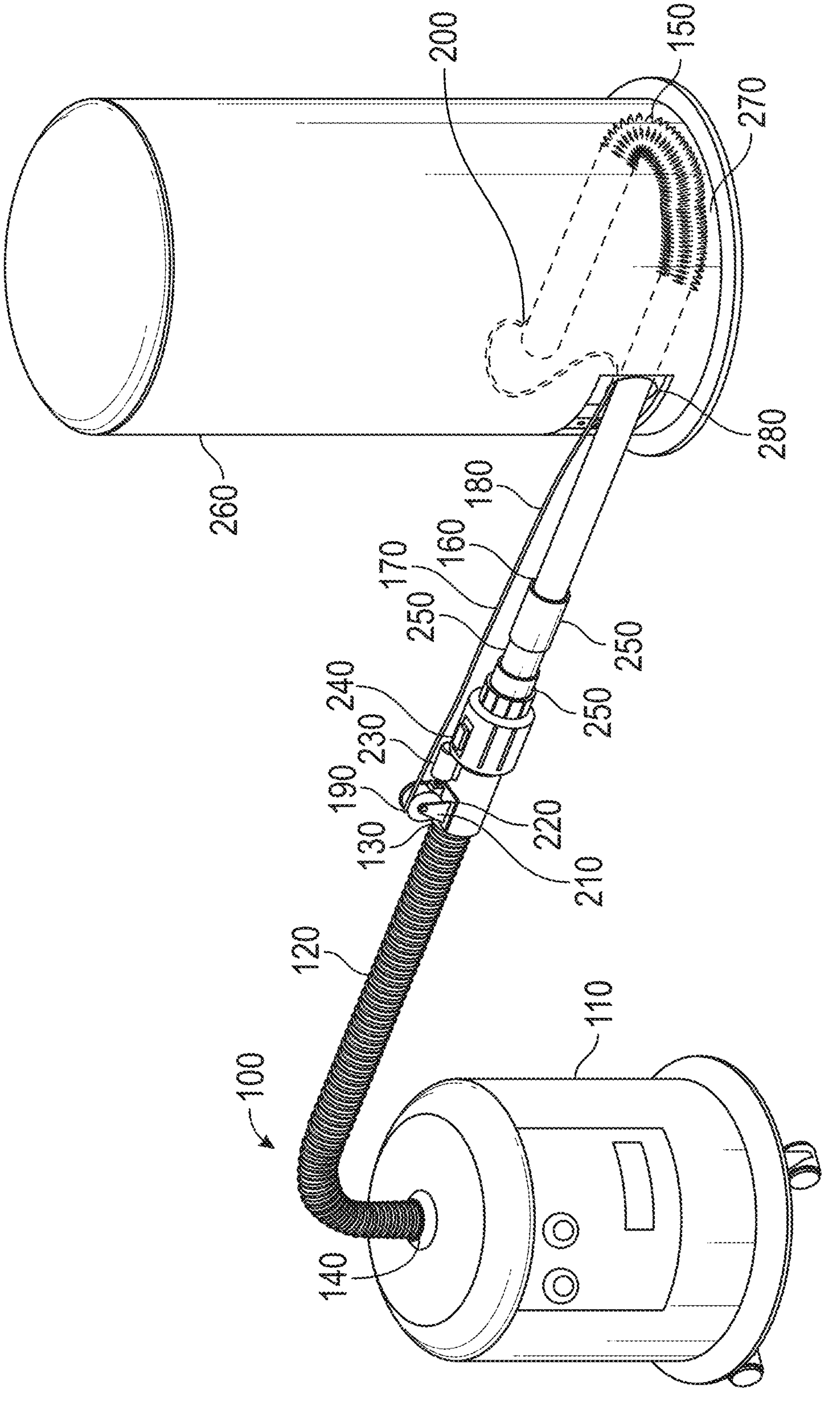
FIG. 2 is a perspective view of the water heater clean out device being used in a water heater according to the invention.

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers, or steps, but not the exclusion of any other element, integer, or step, or group of elements, integers, or steps.

Throughout this specification, the phrase "vacuum cleaner," or variations thereof such as "vacuum," will be understood to imply the inclusion of any type of household appliance or device that is designed to remove dirt, dust, debris, and other particles from floors, carpets, upholstery, and other surfaces through the use of suction. It works by creating a partial vacuum inside a chamber, which causes air to rush in and carry dirt and particles into a dust collection bag, bin, or canister. Here are some common types of vacuum cleaners:

- Upright Vacuum Cleaner: Upright vacuum cleaners are the most traditional and common type. They typically feature a motor and suction head in a single unit, with a handle and dust collection bin or bag attached. Upright vacuums are well-suited for cleaning carpets and large areas, and they often come with attachments for versatile cleaning.
- Canister Vacuum Cleaner: Canister vacuum cleaners consist of a separate unit containing the motor and dust collection bin connected to a long hose and wand. They offer more maneuverability and are suitable for cleaning stairs, upholstery, and hard-to-reach areas. Canister vacuums are versatile and often come with various attachments for different cleaning tasks.
- Stick Vacuum Cleaner: Stick vacuum cleaners are lightweight and slim, resembling a stick with a small motorized head at the base. They are ideal for quick and convenient cleanups on hard floors and low-pile carpets. Stick vacuums are easy to maneuver and store, making them suitable for small living spaces.

Handheld Vacuum Cleaner: Handheld vacuum cleaners are compact and portable units designed for spot cleaning and quick pickups. They are great for cleaning upholstery, car interiors, and tight spaces such as stairs and corners. Handheld vacuums are battery-powered and come in corded or cordless models.

Robot Vacuum Cleaner: Robot vacuum cleaners, also known as robotic vacuums, are autonomous devices equipped with sensors and navigation technology to clean floors automatically. They can navigate around furniture and obstacles, making them convenient for daily maintenance cleaning. Robot vacuums are best suited for hard floors and low-pile carpets.

Wet/Dry Vacuum Cleaner: Wet/dry vacuum cleaners are versatile machines capable of picking up both dry debris and liquid spills. They are often used for cleaning workshops, garages, and outdoor areas. Wet/dry vacuums typically have larger capacities and stronger motors than regular vacuum cleaners.

Central Vacuum System: Central vacuum systems consist of a central unit installed in a home or building, connected to in-wall piping and vacuum ports throughout the premises. They offer powerful suction and quiet operation, with the dust collection unit located away from living spaces, reducing noise and allergen exposure.

Throughout this specification, the phrase "articulating joint," or variations thereof, will be understood to imply the inclusion of any type of mechanism or connection point that allows for movement or adjustment between two or more components. These joints are designed to enable flexibility, positioning, and range of motion, similar to how articulating joints in the human body facilitate movement between bones. Here are some common types of articulating joints found in tools and devices:

Swivel Joint: Swivel joints allow rotation around a fixed point or axis. They are commonly found in tools such as swivel chairs, camera mounts, and hose connectors.

Universal Joint: Also known as a Cardan joint, universal joints transmit rotary motion between shafts that are not in a straight line. They are widely used in driveshafts of vehicles, machinery, and robotics to transfer torque between misaligned shafts.

Ball Joint: Ball joints consist of a ball and socket mechanism that allows rotation in multiple axes. They are commonly used in automotive suspension systems, steering linkages, and some types of machinery.

Hinge Joint: Hinge joints in tools and devices function similarly to those in the human body, allowing movement along one axis. They are found in applications such as doors, gates, and folding mechanisms.

Pivot Joint: Pivot joints in tools enable rotational movement around a fixed point. They are used in various applications such as adjustable lamps, articulating arms, and certain types of clamps.

Linkage Joint: Linkage joints consist of multiple interconnected links that allow complex movement patterns. They are commonly found in robotics, industrial machinery, and articulated tools such as excavators and cranes.

Articulating Arm: An articulating arm is a type of jointed mechanism that allows for precise positioning and movement. They are used in applications such as industrial robots, medical devices, and drafting lamps.

Spherical Rod End: Spherical rod ends, also known as Heim joints or rose joints, provide articulation in a single plane. They are commonly used in mechanical linkages, control systems, and suspension components.

Index of Labelled Features in Figures. Features are listed in numeric order.

Referring to the Figures, there is shown in FIG. 1 the following features:

Element 100 which is a water heater clean out device.
Element 110 which is a vacuum cleaner.
Element 120 which is a rigid vacuum hose.
Element 130 which is a tool end.
Element 140 which is a vacuum cleaner attachment end.
Element 150 which is an articulating joint.
Element 160 which is a vacuum pipe end.
Element 170 which is a pull cord means.
Element 180 which is a pull cord.
Element 190 which is a pull end.
Element 200 which is an attachment end of the pull cord.
Element 210 which is a pulley.
Element 220 which is a cord reel.
Element 230 which is a motor.
Element 240 which is a user operable control.
Element 250 which is a vacuum tube connector.
Element 260 which is a water heater.
Element 270 which is a bottom of the water heater.
Element 280 which is an opening of the water heater.

In a first preferred embodiment of the present invention there is a water heater clean out device configured for attaching to a vacuum cleaner comprising a rigid vacuum hose having a tool end and a vacuum cleaner attachment end for operational attachment to said vacuum cleaner, a first articulating joint operationally attached to said rigid vacuum hose at said tool end, and a vacuum pipe end operationally attached to said articulating joint. The articulating joint is any individual or combination of a swivel joint, an universal joint, a ball joint, a hinge joint, a pivot joint, a linkage joint, an articulating arm, and or a spherical rod end that is configured to pass an open similar in diameter to that of an opening in a water heater or the opening in a shop vacuum.

In an alternative embodiment of the first preferred embodiment of the present invention there is a water heater clean out device wherein said articulating joint is configured to rotate said vacuum pipe end around an inside of a water heater when inserted in a water heater (as in drain valve opening or an electric heating element replacement port).

Rotation of the vacuum pipe inside the water heater can be achieved by prepositioning a set of vacuum pipes and twisting them while inserting them into a water heater opening. Rotation of the vacuum pipes inside the water heater can be accomplished by rotating the inserted pipe or pipes and articulating joint that are inside the water heater.

In an alternative embodiment of the first preferred embodiment of the present invention there is a water heater clean out device further comprising a second articulating joint operationally attached between said first articulating joint and said rigid vacuum hose, and optionally further a plurality of articulating joints including said first articulating joint, said second articulating joint, and a third articulating joint.

In an alternative embodiment of the first preferred embodiment of the present invention there is a water heater clean out device wherein said articulating joint comprises stacked conical sections (as in the bendable section of a bendable straw).

In an alternative embodiment of the first preferred embodiment of the present invention there is a water heater clean out device wherein said articulating joint comprises at least one ball and socket joint section (such as at least one 90 degree rotating tube turn).

In an alternative embodiment of the first preferred embodiment of the present invention there is a water heater clean out device comprising a pull cord means such as a pull cord having a pull end and an attachment end wherein said attachment end is connectively attached to said vacuum pipe end enabling a movement of said vacuum pipe end, and optionally a version that further comprises a pulley, a cord reel, a motor, and a user operable control configured to extend and retract said pull cord to bend and/or straighten said vacuum pipe end in relation to said rigid vacuum hose. The pull cord means can also include a set of pulleys to position and move the vacuum pipes that they are attached to to control.

In an alternative embodiment of the first preferred embodiment of the present invention there is a water heater clean out device wherein said rigid vacuum hose (vacuum pipe) is configured for operational attachment to a vacuum cleaner such as a shop vacuum, a canister vacuum, and/or a central vacuum system.

In a second preferred embodiment of the present invention there is a water heater clean out device comprising a vacuum cleaner, a rigid vacuum hose having a vacuum attachment end operationally connected to said vacuum cleaner and a tool end, an articulating joint operationally attached to said rigid vacuum hose at said tool end, and a vacuum pipe end operationally attached to said articulating joint.

In an alternative embodiment of the second preferred embodiment of the present invention there is a water heater clean out device wherein said articulating joint is configured to rotate said vacuum pipe end around an inside of a water heater when inserted in a water heater clean out.

In an alternative embodiment of the second preferred embodiment of the present invention there is a water heater clean out device further comprising a second articulating joint operationally attached between said first articulating joint and said rigid vacuum hose, optimally a plurality of articulating joints including said first articulating joint, said second articulating joint, and a third articulating joint.

In an alternative embodiment of the second preferred embodiment of the present invention there is a water heater clean out device wherein said articulating joint comprises stacked conical sections.

In an alternative embodiment of the second preferred embodiment of the present invention there is a water heater clean out device wherein said articulating joint comprises at least one ball and socket joint section.

In an alternative embodiment of the second preferred embodiment of the present invention there is a water heater clean out device comprising a pull cord means such as a pull cord having a pull end and an attachment end connectively attached to said vacuum pipe end enabling a movement of said vacuum pipe end, and optionally wherein said pull cord means further comprises a pulley, a cord reel, a motor, and a control configured to extend and retract said pull cord to bend and/or straighten said vacuum pipe end in relation to said rigid vacuum hose.

There is actually no clean out opening on a hot water heater but a spot where one replaces the burnt out element (and there is a drain port, which made need to have the valve removed to access with the device of the present invention)

Cleaning out a water heater as in the present invention provides benefits. For example, the present invention prevents the need for continual hot water flow and sediment that can lead to clogs and decreased water flow, reduces odors caused by deposits within the tank, and improves temperature accuracy for more consistent temperature regulation out of the faucet. Here are some advantages of the water heater clean-out device of the present invention that attaches to a vacuum cleaner and features an articulating joint, pull cord, and pulley/cord reel system:

Efficient Cleaning: The device allows for the effective removal of built-up solids and sediment from the bottom of a water heater, ensuring the appliance operates efficiently and extends its lifespan.

Easy Access to Hard-to-Reach Areas: The articulating joint enables the tool to reach all areas inside the water heater, including corners and crevices that are typically difficult to clean manually.

Convenience: The attachment to a standard vacuum cleaner makes it easy to use without requiring additional or specialized equipment.

User-Friendly Operation: The pull cord and pulley/cord reel system allow the user to maneuver the cleaning tool inside the water heater effortlessly, reducing physical strain and making the cleaning process more manageable.

Cost-Effective Maintenance: Regular use of the clean-out device can prevent the buildup of sediment that can lead to system inefficiencies or failures, potentially saving on costly repairs or replacements.

Safety: By maintaining the cleanliness of the water heater, the device helps prevent overheating and other issues that can arise from excessive sediment buildup, thus enhancing the overall safety of the appliance.

Environmental Benefits: Efficiently operating water heaters use less energy, which contributes to lower household energy consumption and a reduced carbon footprint.

Time-Saving: The device streamlines the cleaning process, saving time compared to manual cleaning methods, which can be labor-intensive and time-consuming.

Durability: Regular cleaning using such a device can help maintain the water heater's structural integrity by preventing corrosion linked to sediment buildup.

Adaptability: The design of the device makes it adaptable to various sizes and types of water heaters, making it a versatile tool for residential and commercial use.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A water heater clean out device configured for attaching to a vacuum cleaner comprising a rigid vacuum hose having a tool end and a vacuum cleaner attachment end for operational attachment to said vacuum cleaner, a first articulating joint operationally attached to said rigid vacuum hose at said tool end, a vacuum pipe end operationally attached to said first articulating joint, and a pull cord having a pull end and an attachment end wherein said attachment end is connectively attached to said vacuum pipe end enabling a movement of said vacuum pipe end and wherein said pull cord further comprises a pulley, a cord reel, a motor, and a user operable control configured to extend and retract said pull cord to bend and/or straighten said vacuum pipe end in relation to said rigid vacuum hose.

2. The water heater clean out device of claim 1, wherein said first articulating joint is configured to rotate said vacuum pipe end around an inside of a water heater when inserted in said water heater.

3. The water heater clean out device of claim 1, further comprising a second articulating joint operationally attached between said first articulating joint and said rigid vacuum hose.

4. The water heater clean out device of claim 3, further comprising a plurality of articulating joints including said first articulating joint, said second articulating joint, and a third articulating joint.

5. The water heater clean out device of claim 1, wherein said first articulating joint comprises stacked conical sections.

6. The water heater clean out device of claim 1, wherein said first articulating joint comprises at least one ball and socket joint section.

7. A water heater clean out device comprising a vacuum cleaner, a rigid vacuum hose having a vacuum attachment end operationally connected to said vacuum cleaner and a tool end, a first articulating joint operationally attached to said rigid vacuum hose at said tool end, a vacuum pipe end operationally attached to said first articulating joint, and a pull cord having a pull end and an attachment end connectively attached to said vacuum pipe end enabling a movement of said vacuum pipe end, wherein said pull cord further comprises a pulley, a cord reel, a motor, and a control configured to extend and retract said pull cord to bend and/or straighten said vacuum pipe end in relation to said rigid vacuum hose.

8. The water heater clean out device of claim 7, wherein said first articulating joint is configured to rotate said vacuum pipe end around an inside of a water heater when inserted in said water heater.

9. The water heater clean out device of claim 7, further comprising a second articulating joint operationally attached between said first articulating joint and said rigid vacuum hose.

10. The water heater clean out device of claim 9, further comprising a plurality of articulating joints including said first articulating joint, said second articulating joint, and a third articulating joint.

11. The water heater clean out device of claim 7, wherein said first articulating joint comprises stacked conical sections.

12. The water heater clean out device of claim 7, wherein said first articulating joint comprises at least one ball and socket joint section.

* * * * *